C. J. BAKER.
BATTERY TERMINAL CONNECTOR.
APPLICATION FILED MAR. 10, 1919.
1,332,482.
Patented Mar. 2, 1920.
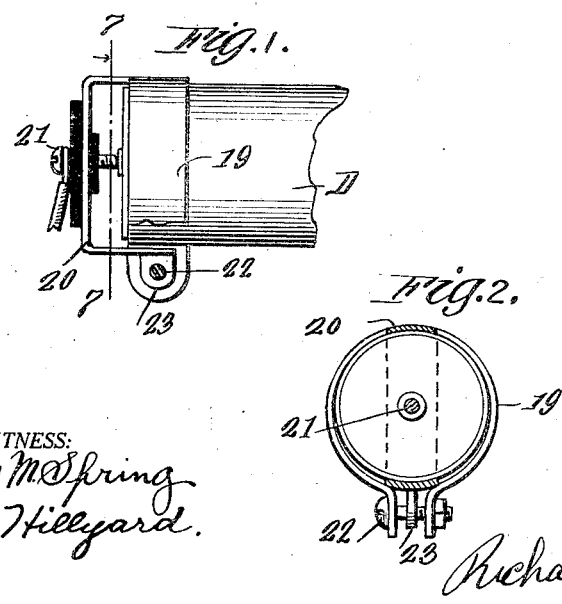

UNITED STATES PATENT OFFICE.

CHARLES J. BAKER, OF ELKHART, INDIANA.

BATTERY-TERMINAL CONNECTOR.

1,332,482.

Specification of Letters Patent.

Patented Mar. 2, 1920.

Application filed March 10, 1919. Serial No. 281,610.

*To all whom it may concern:*

Be it known that I, CHARLES J. BAKER, a citizen of the United States, residing at Elkhart, in the county of Elkhart and State of Indiana, have invented certain new and useful Improvements in Battery-Terminal Connectors, of which the following is a specification.

The invention relates to means whereby a lead wire may be quickly and positively connected to a dry cell such as usually employed in connection with electric flashlights.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

In the drawings hereto attached,

Figure 1 is a detail view of an end portion of a dry battery such as generally used for flash lights provided with a terminal connector embodying the invention; and Fig. 2 is a sectional detail on the line 2—2 of Fig. 1 looking to the right, the dotted lines indicating the portion spanning the sides of the battery and spaced from the end thereof.

Corresponding and like parts are referred to in the following description and indicated in both views of the drawings by like reference characters.

The invention is designed for use in connection with any type of dry battery.

The battery D may be of any ordinary construction of dry cell and is provided at its ends with the usual terminals. To enable a dry cell such as intended for flash lights to be utilized as an adjunct of the signal it has been found necessary to apply means to each end of the battery for connection of a lead wire thereto. These means are indicated most clearly in Figs. 6 and 7 and consist of a clamp 19, a bridge 20 and a fastening 21 which serves a two-fold office of securing means for the lead wire and a conductor for making electric connection with the battery terminal. The clamp 19 consists of a metal strip adapted to encircle the battery and having its ends offset to receive a fastening 22. The bridge 20 is formed as a part of the clamp and spans the sides of the battery and is spaced from the ends thereof. The bridge 20 is provided at its free end with an offstanding lug 23 which is apertured to receive the fastening 22. The fastening, screw or like part 21 is supported in the bridge 20 and is electrically insulated therefrom, as shown most clearly in Fig. 1 and makes electric connection with the battery terminal. Each end of the battery is provided with means substantially, as indicated in the drawings for connection of a lead wire thereto.

By using ordinary dry cells such as constructed for flash lights the batteries may be conveniently located in any position because of their compact structure.

Having thus fully described my invention, what I claim as new and desire to secure by Letters Patent is:—

1. In combination, a dry battery, a clamp secured to an end portion thereof, a bridge spanning the end of the battery and connected thereto by the clamp and a fastening mounted upon the bridge and electrically insulated therefrom and serving as means for securing a lead wire and connecting the same with a battery terminal.

2. In combination, a dry battery, a clamp encircling the battery and having offstanding ends, a fastening connecting the offstanding ends and securing the clamp to the battery, a bridge forming a part of the clamp and connected at one end thereto and having its opposite end engaging the said fastening, said bridge extending across the end of the battery and spaced therefrom, and means mounted on the bridge and electrically insulated therefrom and serving to connect the lead wire thereto and in electrical connection with a terminal of the battery.

In testimony whereof I affix my signature in presence of two witnesses.

CHARLES J. BAKER.

Witnesses:
L. D. HALL,
EDNA SCHLARB.